(12) United States Patent
Huebel et al.

(10) Patent No.: US 8,473,237 B2
(45) Date of Patent: Jun. 25, 2013

(54) METHOD FOR CALIBRATING A SPECIMEN STAGE OF A METROLOGY SYSTEM AND METROLOGY SYSTEM COMPRISING A SPECIMEN STAGE

(75) Inventors: Alexander Huebel, Aalen (DE); Matthias Manger, Aalen-Unterkochen (DE); Gerd Klose, Oberkochen (DE); Uwe Schellhorn, Aalen (DE); Michael Arnz, Oberkochen (DE)

(73) Assignee: Carl Zeiss SMS GmbH, Jena (DE)

( * ) Notice: Subject to any disclaimer, the term of this patent is extended or adjusted under 35 U.S.C. 154(b) by 299 days.

(21) Appl. No.: 12/726,908

(22) Filed: Mar. 18, 2010

(65) Prior Publication Data

US 2010/0241384 A1    Sep. 23, 2010

Related U.S. Application Data

(60) Provisional application No. 61/161,147, filed on Mar. 18, 2009.

(30) Foreign Application Priority Data

Mar. 18, 2009 (DE) .................. 10 2009 013 779
Apr. 8, 2009 (DE) .................. 10 2009 016 858

(51) Int. Cl.
  *G06F 19/00* (2011.01)
  *G01B 11/14* (2006.01)
(52) U.S. Cl.
  USPC .......................................... 702/94; 356/620
(58) Field of Classification Search
  USPC .......... 702/94, 34–35, 40, 81, 84–85, 95, 702/127, 150, 152–153, 182–183, 189, 196; 33/1 BB, 1 M, 503, 507, 545–547, 553–556; 356/450, 455–456, 462, 496, 500, 509–510, 356/515, 614–616, 618, 620, 622; 382/141, 382/144–145, 147–149; 703/2, 4
  See application file for complete search history.

(56) References Cited

U.S. PATENT DOCUMENTS

| 6,948,254 B2 * | 9/2005 | Stiblert et al. ............... 33/502 |
| 7,528,960 B2 | 5/2009 | Boesser et al. ............ 356/500 |

(Continued)

FOREIGN PATENT DOCUMENTS

| DE | 10 2007 017 630 | 11/2007 |
| DE | 10 2006 059 433 | 6/2008 |

(Continued)

OTHER PUBLICATIONS

Arnz et al., Calibration of Test Masks Used for Lithography Lens Systems, 2006, 22nd European Mask and Lithography Conference (EMLC), 12 pp.*

(Continued)

*Primary Examiner* — Toan Le
(74) *Attorney, Agent, or Firm* — Fish & Richardson P.C.

(57) ABSTRACT

A method for calibrating a specimen stage of a metrology system is provided, in which a specimen that has multiple marks is positioned successively in different calibration positions, each mark is positioned in the photography range of an optical system by means of the specimen stage in each calibration position of the specimen, and the mark position is measured using the optical system. A model is set up that describes positioning errors of the specimen stage using a system of functions having calibration parameters to be determined. The model takes into consideration at least one systematic measurement error that occurs during the measurement of the mark positions. The values of the calibration parameters are determined based on the model with consideration of the measured mark positions.

28 Claims, 7 Drawing Sheets

U.S. PATENT DOCUMENTS

| | | | |
|---|---|---|---|
| 7,694,426 B2 * | 4/2010 | Heiden et al. | 33/503 |
| 2005/0086820 A1 | 4/2005 | Stiblert et al. | 33/502 |
| 2007/0279607 A1 | 12/2007 | Smith et al. | 355/52 |
| 2008/0201971 A1 | 8/2008 | Heiden et al. | 33/503 |
| 2009/0002486 A1 | 1/2009 | Fricke et al. | 348/95 |
| 2009/0024344 A1 | 1/2009 | Heiden et al. | 702/95 |
| 2009/0033894 A1 | 2/2009 | Czerkas | 355/52 |

FOREIGN PATENT DOCUMENTS

| | | |
|---|---|---|
| DE | 10 2007 000 999 | 8/2008 |
| DE | 10 2007 030 390 | 1/2009 |
| DE | 10 2007 033 345 | 2/2009 |
| DE | 10 2007 036 815 | 2/2009 |
| WO | 2008/055589 | 5/2008 |

OTHER PUBLICATIONS

Ye et al., An Exact Algorithm for Self-Calibration of Two-Dimensional Precision Metrology Stages, 1997, Precision Engineering 20, pp. 16-32.*

German Search Report for German Application No. 10 2009 016 858.3 dated Oct. 27, 2009.

Michael T. Takac et al., "Self-calibration in two-dimensions: the experiment", *SPIE*, vol. 2725, pp. 130-146 (1996).

* cited by examiner

METHOD FOR CALIBRATING A SPECIMEN STAGE OF A METROLOGY SYSTEM AND METROLOGY SYSTEM COMPRISING A SPECIMEN STAGE

CROSS-REFERENCE TO RELATED APPLICATIONS

Pursuant to 35 U.S.C. §119, this application claims the benefit of prior U.S. provisional application No. 61/161,147, filed Mar. 18, 2009; German patent application no. 10 2009 013 779.3, filed on Mar. 18, 2009; and German patent application no. 10 2009 016 858.3, filed on Apr. 8, 2009. The contents of the prior applications are incorporated herein by reference in their entirety.

TECHNICAL FIELD

This document generally relates to a method for calibrating a specimen stage of a metrology system and a metrology system having a specimen stage.

BACKGROUND

A metrology system having a specimen stage that can be positioned with high accuracy is useful for numerous measurement tasks. Local measurements can be made with the metrology system in which sensors are fastened to, for example, the specimen stage, in order to position the specimen stage with high accuracy and reproducibility in an optical field to be measured, and to be able to measure the particular optical parameters (for example, intensity or polarization) with positional resolution. If the optical parameter depends on location, a specimen stage that cannot be reproducibly or accurately positioned leads to a measurement error that is obtained as the product of the positioning error multiplied by the gradient of the parameter to be measured.

The metrology system can also be used for length measurement or to measure distances. For example, the object to be measured may contain two distinguishing marks whose separation distance is to be measured. The object can be positioned on the specimen stage, and each of the markings may be positioned at a reference point by using the specimen stage, which may be within the image range of, for example, a microscope. From the photographs of the two marks in combination with the measured positions of the specimen stage, the distance between the marks can be determined as the difference between the two measured positions. It is also possible to move the microscope relative to the object to be measured by means of the specimen stage, or to move both the microscope and the object to be measured. The specimen stage is calibrated if it can be positioned reproducibly but inaccurately.

SUMMARY

In general, in one aspect, a method is provided for calibrating a specimen stage of a metrology system that allows a highly accurate calibration. A metrology system having a specimen stage calibrated with high accuracy is also provided.

In general, in another aspect, a method for calibrating a specimen stage of a metrology system is provided, in which a specimen having multiple marks is positioned successively in different calibration positions. Each mark is positioned by the specimen stage within the photography range of an optical system in each calibration position of the specimen, and the positions of the marks are measured by the optical system. A model is established to describe positioning errors of the specimen stage by a system of functions having calibration parameters to be determined, with at least one systematic measurement error that occurs in the measurement of the positions of the marks being taken into consideration in the model. Based on the model with consideration of the measured positions of the marks, the values of the calibration parameters are determined.

The method has an advantage that the inaccuracy of the specimen stage itself can be calibrated in the calibration process, and in addition, at least one other systematic measurement error that occurs in the measurement of the positions of the marks can also be calibrated, allowing the calibration process to be performed with great accuracy.

Implementations can include one or more of the following features. Systematic measurement errors include, for example, measurement errors that occur even if the specimen stage is accurately positioned. The at least one systematic measurement error can be a systematic measurement error of the optical system and/or of the metrology system.

The at least one systematic measurement error is taken into consideration linearly in the model. This makes it simpler to determine the calibration parameters. The systematic measurement error is thus considered to be a linear measurement error, which may depend linearly on another measurable variable.

The Gaussian method of least squares of the errors can be used to determine the values of the calibration parameters.

The specimen can be positioned in at least three different calibration positions. The calibration positions can include a rotation and a translation.

The at least one systematic measurement error can be an imaging error of the optical system, for example, a microscope. For example, the systematic measurement error can involve a rotation of the system of coordinates of the photographed image relative to the system of coordinates of the specimen stage. Other errors, for example, an erroneous measurement scale (enlargement factor), distortion, or coma, can also be corrected. It is also possible to calibrate systematic errors in the image processing of the photographed marks.

The at least one systematic measurement error can be a projection error in the measurement of the positions of the marks due to a tilt of the specimen. The tilt of the specimen is determined in each calibration position by an additional measurement. This measurement, for example, can be made by measuring the z-component of the position of each mark (perpendicular to the plane on which the marks lie). It is also possible to determine the tilt by another measuring instrument.

The at least one systematic measurement error can be caused by a non-planar arrangement of the marks (for example, if the top of the specimen on which the marks is formed is uneven). The projection errors caused by this effect can in turn be taken into consideration in the measurement of the position of the mark. The z-positions of the marks can be measured for this purpose.

The specimen stage can be moved in a plane to position the marks, with the at least one systematic measurement error being a measurement error that is proportional to the position of the specimen stage perpendicular to the plane. Such a systematic measurement error can be taken into consideration in the model without the need to carry out a complete three-dimensional calibration of the specimen stage. A desired two-dimensional calibration can be done in which systematic measurement errors that are proportional to the position of the specimen stage perpendicular to the plane are also considered. Such measurement errors occur, for example, when the specimen stage positions are measured by interferometry in the plane and the reflection surface on the specimen stage used for this is oriented not exactly perpendicular to the plane.

The at least one systematic measurement error can be caused by a rotation of the specimen stage that may depend on the x- and/or y-position of the specimen stage, which can be positioned in, for example, the xy-plane without the need to know the exact position of the center of rotation. This can be taken into consideration by introducing an additional solution parameter into the model, so that residual errors (Abbe errors) that occur because the center of rotation is not exactly known, do not have a first-order effect on the result of the calibration.

The at least one systematic measurement error can be caused by a deformation of the specimen from gravity. In this case, the deformation of the specimen can be computed in each calibration position and subtracted from the measurement data as a correction. The mechanical properties of the specimen and the resting points on the specimen stage (including the position of the specimen in each calibration position) can be taken into consideration. When the deformation of the specimen is known in this way, except for a proportionality factor, this factor can be determined by introducing an additional solution parameter into the model. Any uncertainty of this factor then no longer has an effect on the result of the calibration. The proportionality factor can then be measured with the specimen stage calibrated in this way.

The at least one systematic measurement error can appear because the marks are too far apart. This is the case when the spacing of the marks is too large compared to the spatial gradient of the specimen stage.

In a two-dimensional calibration in which the fractions of the specimen stage error that vary rapidly in space include four additive components, which are constant in either the x or the y direction, the measuring and computing efforts can be kept small by the following procedure (the specimen stage is preferably positionable in the xy-plane). The marks are arranged on the specimen in a Cartesian grid. The errors are described in the model by multiple groups of parameters that contain fractions constant in x and fractions constant in y and other fractions, with the latter no longer providing high spatial resolution. In the calibration sequence (sum of all calibration positions), at least one calibration position is obtained in which the specimen is rotated asymmetrically to the grid (for example, a rotation of 30° or 60°).

It is beneficial for the marks to be designed so that they are symmetrical under all transformations to reach the particular calibration position.

The measured values for the positions of marks can be determined, for example, as the difference between the specimen stage position and the position in the photographed image of the mark, when an image of the mark is photographed with the optical system.

The system of functions can be a system of linear equations for the calibration parameters. This allows a relatively rapid calculation of the calibration parameters, since the calculation can be made through the system of linear equations.

The calibration can be performed in one, two, or three dimensions.

The specimen has at least three marks that do not all lie on the same straight line. The marks on the specimen can be arranged in a Cartesian grid. In this way, the calibration parameters can be determined distinctly.

The specimen is preferably positioned each time in its calibration positions on the specimen stage, and moved by it. It is also possible to move the optical system relative to the specimen by means of the specimen stage. It is also feasible to move both the optical system and the specimen.

Multiple specimens, each having multiple marks, can be positioned successively in different calibration positions, with each mark in each calibration position of each specimen being positioned using the specimen stage within the photography range of the optical system, and with the mark position being measured by using the optical system.

The calibration parameters can be determined iteratively to achieve greater accuracy.

In general, in another aspect, a metrology system having a specimen stage and a control unit is provided. The control unit controls the specimen stage to bring it to a predetermined position, with the control unit controlling the specimen stage based on a calibration model that takes into consideration positioning errors of the specimen stage and at least one systematic measurement error that occurred in the calibration of the specimen stage, in order to position the specimen stage (reproducibly) in the predetermined position.

Implementations can include one or more of the following features. The at least one measurement error can be a systematic measurement error that is present even if the specimen stage would have been positioned absolutely accurately in the calibration.

The calibration model of the metrology system can use the calibration parameters that have been determined by the calibration method (including its refinements).

In general, in another aspect, a device for implementing the calibration method (including its refinements) is made available, which includes an optical system for measuring the positions of the marks, a control unit that controls the specimen stage for positioning the marks, and a processing module that calculates the values of the calibration parameters based on the model, taking into consideration the measured positions of the marks.

The processing module may be part of the control unit. The control unit can be part of the metrology system. It is also possible for the device for implementing the calibration method to be the metrology system itself.

It is to be understood that the aforementioned features and those still to be described below can be used not only in the specified combinations, but also in other combinations or singly, without departing from the scope of the present invention.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
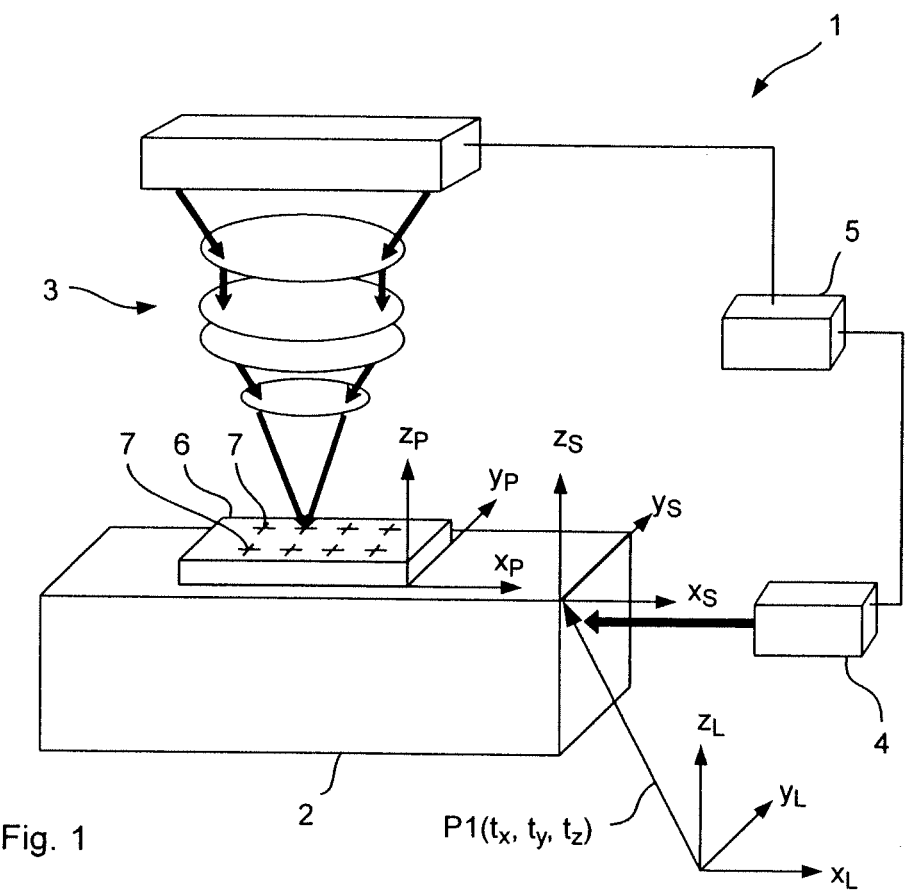
FIG. 1 is a schematic diagram showing an example metrology system.

Referring to FIG. 1, in some implementations, a metrology system 1 includes a specimen stage 2 that is movable at least in the x- and y-directions, a microscope 3, a measuring module 4, and a control unit 5. The x-position of the specimen stage 2 can be measured by using the measuring module 4 based on interferometry. Similarly, the y-position of the specimen stage 2 can be measured by using another measuring module, not shown.

A specimen 6 having multiple marks 7 is positioned on the specimen stage 2. The control unit 5 can control the specimen stage 2 so that the individual marks 7 are positioned successively in a photography range and/or the image field of the microscope 3, so that the positions of the individual marks 7 can be measured from the photographs in combination with the position of the specimen stage 2.

The specimen 6 and the marks 7 can be measured multiple times by the metrology system 1 in different calibration positions of the specimen 6 on the specimen stage 2. This can be used to calibrate one, two, or all three dimensions of the specimen stage 2 and/or of various supports for supporting the specimen 6.

The calibration in two dimensions (for example, in the x- and y-directions) will be described below, with the assumption that both the specimen stage 2 (including the support points for the specimen 6) as well as the specimen 6 each behaves as a rigid object, so that no deformations occur during the travel of the specimen stage 2 and/or while moving the specimen 6 for the different calibration positions.

In some implementations, a model is established in which the positioning error of the specimen stage is represented by a system of functions having calibration parameters to be determined. The model may take into account at least one systematic measurement error that occurs in the measurement of the positions of the marks. As described in more detail below, the systematic measurement error can include, for example, an imaging error of the microscope 3, an error due to a tilt of the specimen 6 relative to the specimen stage 2, an error caused by an uneven arrangement of the marks 7, an error caused by a gravity-induced deformation of the specimen 6, any combination of the above, or other types of errors.

In some implementations, the control unit 5 can include a processing module to establish the model and solve equations described below as part of the calibration process. In some implementations, a separate processing module can be used to establish the model and solve the equations. The processing module may include a data processor and a storage device to store instruction codes that can be executed by the data processor for performing the processes described below.

The position-dependent specimen stage errors f can be described using a system of functions whose parameters $\lambda_1$, $\lambda_2, \ldots \lambda_R$ (also called the specimen stage parameters below) are to be determined by the calibration. The relationship between the specimen stage parameters and the specimen stage errors can be, for example, linear:

$$\begin{pmatrix} f_x(t_x, t_y, t_z) \\ f_y(t_x, t_y, t_z) \\ f_z(t_x, t_y, t_z) \end{pmatrix} = \underline{F}(t_x, t_y, t_z) \cdot \begin{pmatrix} \lambda_1 \\ \vdots \\ \lambda_R \end{pmatrix} \quad (1)$$

The x-error of the specimen stage $f_x$, the y-error of the specimen stage $f_y$, and the z-error of the specimen stage $f_z$ are continuous functions of the specimen stage position $(t_x, t_y, t_z)$ in a fixed coordinate system L of the metrology system as indicated in FIG. 1 by the arrow P1, and are linked to the specimen stage parameters $\lambda_1$ to $\lambda_R$ through the matrix F. The matrix F represents the selected system of functions and depends on the specimen stage positions $t_x$, $t_y$, and $t_z$.

The marks 7 have coordinates $x_{Pq}$, $y_{Pq}$, $z_{Pq}$ (q=1, 2, … Q) in a coordinate system P fixed relative to the specimen 6, and are connected to the coordinates of the specimen stage 2 through translations and rotations of the specimen 6 carried out for the individual calibration positions. For example, in a two-dimensional calibration, the relationship between the coordinates is as follows:

$$\begin{pmatrix} x_s \\ y_s \\ z_s \end{pmatrix} = R_z(\psi_z) \cdot \begin{pmatrix} x_{Pq} \\ y_{Pq} \\ z_{Pq} \end{pmatrix} + \begin{pmatrix} r_x \\ r_y \\ 0 \end{pmatrix} \quad (2)$$

In Formula (2), $x_S$, $y_S$, and $z_S$ represent the coordinates of the fixed coordinate system S of the specimen stage 2. $R_z(\Psi_z)$ represents the rotation of the specimen 6 around the z-axis of the coordinate system S of the specimen stage 2, and $r_x$ and $r_y$ represent the translation of the specimen 6 relative to the specimen stage 2.

The coordinates $x_{Pq}$, $y_{Pq}$, $z_{Pq}$ of the marks 7 do not have to be known in advance. Their values, which are also called specimen parameters, can be determined by calibration.

A linear system of equations is set up for the specimen stage and specimen parameters by using the fact that with the above assumptions, the measured coordinates of the marks 7 can be accounted for by adding the specimen stage error to its actual coordinates. In two dimensions the relationship reads as follows:

$$\begin{pmatrix} mx_{S1}^{(1)} \\ mx_{S2}^{(1)} \\ \vdots \\ mx_{SN}^{(M)} \\ my_{S1}^{(1)} \\ my_{S2}^{(1)} \\ \vdots \\ my_{SN}^{(M)} \end{pmatrix} = \begin{pmatrix} x_{S1}^{(1)} \\ x_{S2}^{(1)} \\ \vdots \\ x_{SN}^{(M)} \\ y_{S1}^{(1)} \\ y_{S2}^{(1)} \\ \vdots \\ y_{SN}^{(M)} \end{pmatrix} + \begin{pmatrix} f_x(t_{x1}, t_{y1}) \\ f_x(t_{x2}, t_{y2}) \\ \vdots \\ f_x(t_{xN}, t_{yN}) \\ f_y(t_{x1}, t_{y1}) \\ f_y(t_{x2}, t_{y2}) \\ \vdots \\ f_y(t_{xN}, t_{yN}) \end{pmatrix} \quad (3)$$

In this matrix, $mx_{Si}^{(J)}$ and $my_{Si}^{(J)}$ represent the measured x- and y-values for the specimen stage coordinates of the $i^{th}$ individual measurement. The superscript index J refers to the associated calibration position of the specimen 6 and runs from 1 to the number M of measured calibration positions. On the right side in the first vector are the actual specimen stage coordinates $x_{Si}^{(J)}$ and $y_{Si}^{(J)}$ of the marks 7, which are indexed by the same system. In the second vector on the right side are given the x- and y-components of the specimen stage error at the specimen stage position ($t^{xi}$, $t_{yi}$) that was reached in the $i^{th}$ individual measurement.

By inserting Equations (1) and (2) in Equation (3), a linear system of equations is obtained in the specimen stage and specimen parameters. Rotations of the specimen stage are not taken into consideration according to the usual assumptions, only the rotation of the specimen around the z-axis is taken into consideration:

$$\begin{pmatrix} mx_{S1}^{(1)} \\ mx_{S2}^{(1)} \\ \vdots \\ mx_{SN}^{(M)} \\ my_{S1}^{(1)} \\ my_{S2}^{(1)} \\ \vdots \\ my_{SN}^{(M)} \end{pmatrix} = \underline{K}(\psi_z^{(J)}, r_x^{(J)}, r_y^{(J)}, t_{xi}, t_{yi}) \cdot \begin{pmatrix} \lambda_1 \\ \vdots \\ \lambda_R \\ x_{P1} \\ \vdots \\ x_{PQ} \\ y_{P1} \\ \vdots \\ y_{PQ} \end{pmatrix} \quad (4)$$

It was found that systematic errors of the metrology system 1 are detrimentally degraded during the measurement of mark positions. Even a very high expenditure on design and actual construction of the metrology system 1 cannot completely avoid such systematic errors. For this reason, such systematic errors are included here in the considerations during calibration. This will be described here by way of example with reference to systematic imaging errors of the microscope 3.

Thus, another column can be added in the matrix K for each constant and systematic imaging error. An additional solution parameter $\tau_1$, $\tau_2$, etc., is included in the parameter-vector for each additional column, arriving at Formula 5 below:

$$\begin{pmatrix} mx_{S1}^{(1)} \\ mx_{S2}^{(1)} \\ \vdots \\ mx_{SN}^{(M)} \\ my_{S1}^{(1)} \\ my_{S2}^{(1)} \\ \vdots \\ my_{SN}^{(M)} \end{pmatrix} = \underline{K} \begin{bmatrix} v_{1,x}(x_{L1}, y_{L1}) & v_{2,x}(x_{L1}, y_{L1}) & \cdots \\ v_{1,x}(x_{L2}, y_{L2}) & v_{2,x}(x_{L2}, y_{L2}) & \cdots \\ \vdots & \vdots & \\ v_{1,x}(x_{LN}, y_{LN}) & v_{2,x}(x_{LN}, y_{LN}) & \cdots \\ v_{1,y}(x_{L1}, y_{L1}) & v_{2,y}(x_{L1}, y_{L1}) & \cdots \\ v_{1,y}(x_{L2}, y_{L2}) & v_{2,y}(x_{L2}, y_{L2}) & \cdots \\ \vdots & \vdots & \\ v_{1,y}(x_{LN}, y_{LN}) & v_{2,y}(x_{LN}, y_{LN}) & \cdots \end{bmatrix} \cdot \begin{pmatrix} \lambda_1 \\ \vdots \\ \lambda_P \\ x_{P1} \\ \vdots \\ x_{PQ} \\ y_{P1} \\ \vdots \\ y_{PQ} \\ \tau_1 \\ \tau_2 \\ \vdots \end{pmatrix} \quad (5)$$

Here, $v_{1,x}$ represents the x component of the first error pattern, $v_{1,y}$ represents the y component of the first error pattern, and $v_{2,x}$ represents the x component of the second error pattern, and so forth, with the error pattern being interpreted at the actual mark positions ($x_{Li}$, $y_{Li}$) in the photography range or image field of the microscope 3. These image field positions thus enter into the interpretation as additional information. The error pattern can be, for example, image rotation, incorrect enlargement factor, distortion, or coma.

In some implementations, the linear system of equations according to Formula (5) is resolved according to the parameter vector, with which the specimen stage errors in the form of the parameters $\lambda_1$ to $\lambda_R$, the positions ($x_{Pq}$, $y_{Pq}$) of the marks 7 relative to one another, and the error patterns of the microscope 3 in the form of the parameters $\tau_1$, $\tau_2$ are known. With an overdetermined system of equations, the Gaussian method of least squares of the errors is used to determine the solution parameters of the parameter vector based on best fit.

Figure 2:
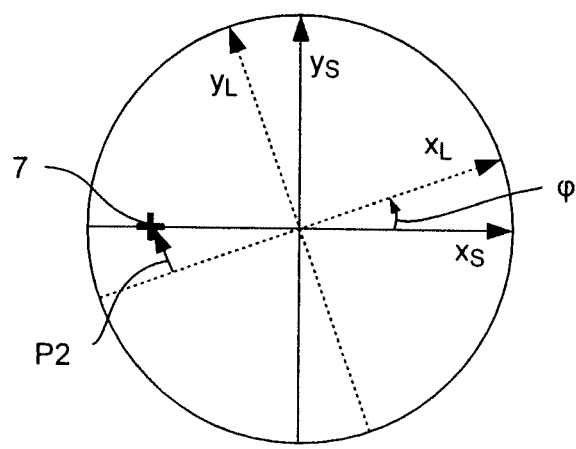
FIG. 2 is a diagram showing an example systematic optical measurement error of a microscope in FIG. 1.

As an example of an error pattern of the microscope, image rotation will be described, which is the rotation of the image coordinate system relative to the coordinate system S of the specimen stage. Since the coordinate system L of the metrology system 1 is chosen so that it coincides with the image coordinate system (which is equal to the coordinate system of the photograph), the image coordinate system is likewise labeled L and the corresponding values have the letter L as an index. The photography range or the image field of the microscope 3 is shown in FIG. 2. The image rotation leads to a measurement error according to the following Equation 6:

$$\begin{pmatrix} \delta x_L \\ \delta y_L \end{pmatrix} = \begin{pmatrix} \cos\varphi - 1 & \sin\varphi \\ -\sin\varphi & \cos\varphi - 1 \end{pmatrix} \cdot \begin{pmatrix} x_L \\ y_L \end{pmatrix} \approx \begin{pmatrix} +\varphi \cdot y_L \\ -\varphi \cdot x_L \end{pmatrix} \quad (6)$$

wherein $\varphi$ indicates the image rotation (angle of rotation). The measurement error is shown as the arrow P2. With small angles of rotation, the linear approximation given in Equation (6) can be used. This leads to the linear system of equations given in Equation (7) below, in which only one optical error pattern (the image rotation) is taken into account. The corresponding additional solution parameter is then the angle of rotation $\varphi$.

$$\begin{pmatrix} mx_{S1}^{(1)} \\ mx_{S2}^{(1)} \\ \vdots \\ mx_{SN}^{(M)} \\ my_{S1}^{(1)} \\ my_{S2}^{(1)} \\ \vdots \\ my_{SN}^{(M)} \end{pmatrix} = \underline{K} \begin{bmatrix} y_{L1} \\ y_{L2} \\ \vdots \\ y_{LN} \\ -x_{L1} \\ -x_{L2} \\ \vdots \\ -x_{LN} \end{bmatrix} \cdot \begin{pmatrix} \lambda_1 \\ \vdots \\ \lambda_P \\ x_{P1} \\ \vdots \\ x_{PQ} \\ y_{P1} \\ \vdots \\ y_{PQ} \\ \varphi \end{pmatrix} \quad (7)$$

A calibration can be performed in which an imaging error of the microscope 3 is also taken into consideration in the calibration of the specimen stage 2.

Multiple optical imaging errors can be considered simultaneously, and it can be determined whether an improvement occurs in the calibration or not. If an improvement occurs, the corresponding imaging error is included in the matrix K. If not, the corresponding imaging error is not considered in the matrix K.

In some implementations, to examine the efficacy of the calibration method, a specimen 6 with 11×11 marks 7 in a square 7 mm grid was tested, with six calibration positions being considered. In the first calibration, the marks 7 are superimposable on the grid of the specimen stage. In the second calibration, the specimen 6 is shifted by one grid point in the +x direction ($r_x$=+7 mm). In the third calibration position the specimen 6 is shifted by one grid point in the −x direction ($r_x$=−7 mm). In the fourth calibration position the specimen 6 is rotated by 90° ($\Psi_z$=π/2). In the fifth calibration position the specimen 6 is rotated by 90° and is then shifted by one grid point in the +x direction. In the sixth calibration position the specimen 6 is rotated by 90° and is then shifted by one grid point in the −x direction. These six calibration positions will be called the standard example in the description below.

The difference between the values of the 11×11 specimen stage parameters obtained by solving Equation (5) or (7) with given inaccuracies in the specimen stage positioning and given systematic errors, and the simulated values at these grid points for the ideal case (i.e., no specimen stage positioning inaccuracies and no systematic measurement errors) is examined as the calibration error. The systematic image rotation error was taken as $\phi=100$ μrad, and 3 μm standard deviations in x and y were taken as positioning inaccuracies of the specimen stage 2 for translations. The calibration error with consideration of image rotation during calibration was smaller than $10^{-12}$ m overall, which can be attributed to numerical inaccuracies and second-order effects.

The imaging errors considered no longer affect the calibration errors in the first order, so that imaging errors and specimen stage errors are largely decoupled. Because of this, the requirements for the optics of the microscope 3 and for the positioning accuracy are lower.

Other systematic measurement errors will be described below that may occur during calibration and that can be taken into consideration during the calibration either alone or in combination with one or more of the systematic measurement errors described here.

Figure 3:
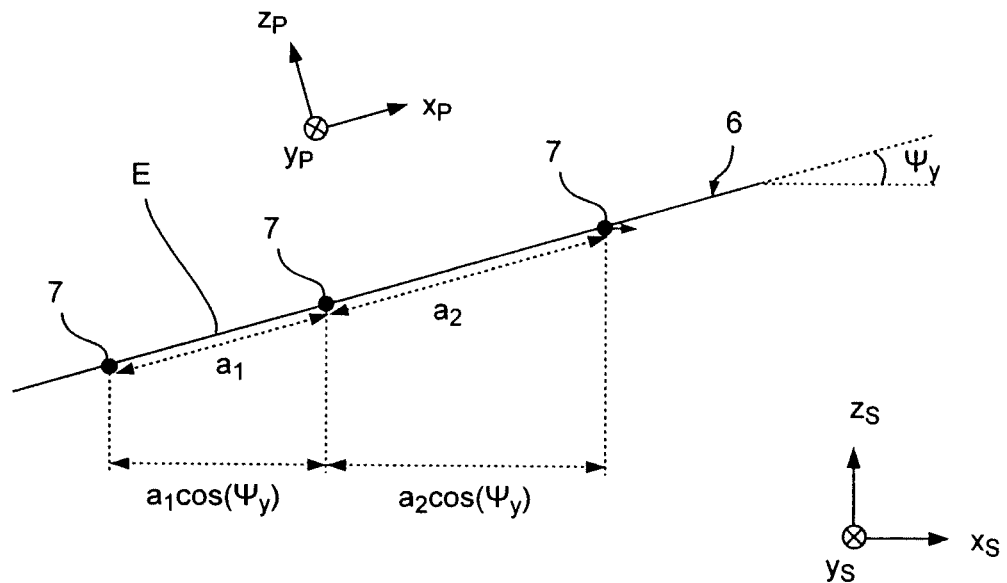
FIG. 3 is a diagram showing an example projection error.

Thus, for example, as indicated schematically in FIG. 3, the specimen 6 can have a planar surface E on which the marks 7 are made, and that is tilted relative to the $x_S y_S$ plane of the specimen stage coordinate system P. In the example shown in FIG. 3, the specimen 6 is tilted only around the $y_S$ axis by the tilt angle $\Psi_y$. Only the coordinates $x_S$ and $y_S$ of the marks 7 enter into the two-dimensional calibration, so that all separations appear shortened by the cosine of the tilt angle by the projection on the $x_S y_S$ plane (projection error). In the example shown in FIG. 3, the distance $a_1 \cdot \cos(\Psi_y)$ is obtained instead of the distance $a_1$, and the shortened value $a_2 \cdot \cos(\Psi_y)$ is obtained instead of the distance $a_2$. Since the tilt may be different in each calibration position, the measured results would contradict the supposition of a rigid shift of the specimen 6 in the $x_S y_S$ plane.

Naturally, there may be not only a tilt around the $y_S$ axis but also a tilt around the $x_S$ axis of the specimen stage coordinate system S (the corresponding tilt angle would then be $\Psi_x$).

To take these systematic errors into consideration during the calibration, the tilt angles $\Psi_x$ and $\Psi_y$ are measured for each calibration position and are taken into consideration as follows when forming the matrix K according to Formula (4):

$$\underline{K}(\Psi_z^{(J)}, r_x^{(J)}, r_y^{(J)}, t_{xi}, t_{yi}) \rightarrow \underline{K}(\Psi_x^{(J)}, \Psi_y^{(J)}, \Psi_z^{(J)}, r_x^{(J)}, r_y^{(J)}, t_{xi}, t_{yi}) \quad (8)$$

Examined here as the calibration error is the difference between the values of the 11×11 specimen stage parameters as obtained by solving Equation (4) with the matrix K according to Equation (8) with given inaccuracies in the positioning of the specimen stage and given systematic errors, and the simulated values at these grid points for the ideal case. Thus tilts around the $x_S$ axis and the $y_S$ axis are taken into consideration both in the solution of Equation (4) and in the simulation, but tilt errors are also taken into consideration as systematic errors in addition in the solution of Equation (4), with the assumptions that in the first calibration position of the standard example $\Psi_x=300$ μrad, $\Psi_y=200$ λrad, in the second calibration position of the standard example $\Psi_x=-500$ μrad, and in the fourth calibration position of the standard example $\Psi_x=-300$ μrad. The calibration error considering the tilt of the specimen 6 was always smaller than $10^{-12}$ m, which can be attributed to numerical inaccuracies and second-order effects.

Figure 4:
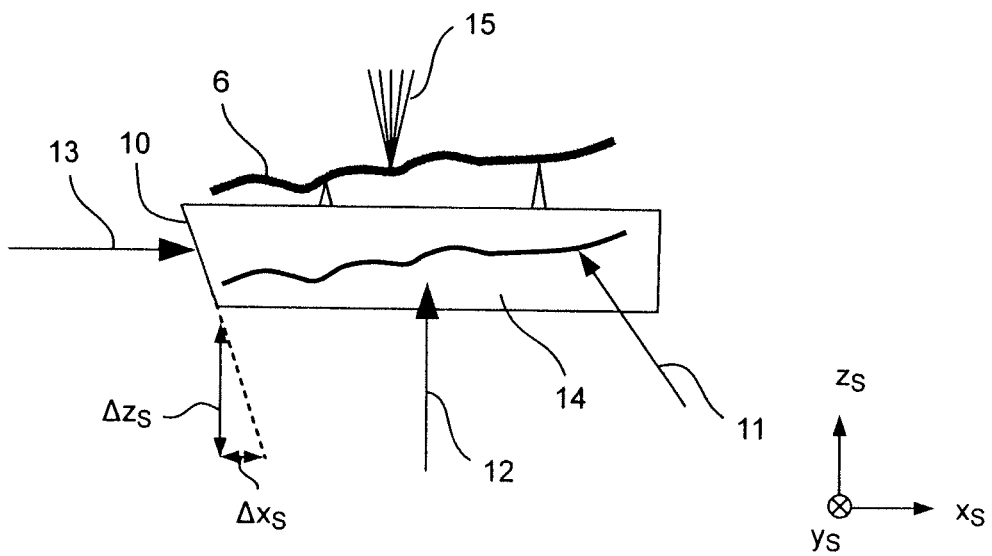
FIG. 4 is a schematic diagram showing an example systematic measurement error based on an uneven arrangement of marks.

Specimen stage errors proportional to z can also occur. As shown schematically in FIG. 4, the mirror 10 on the specimen stage 2 for the measuring module 4 can be tilted around the $y_S$ axis so that an x translation proportional to the z position of the specimen stage 2 occurs (crosstalk takes place from $\Delta z_S$ to $\Delta x_S$). The corresponding track 11 of a measuring module (for which a representative beam 12 is drawn in) for the y direction is shown in FIG. 4. There is also a corresponding track for the measuring module 4 and the corresponding beam 13. A bundle of rays 15 is also shown schematically in FIG. 4 that represents the detection by means of the microscope 3. The $x_S$ translation of the specimen stage is proportional to the surface profile of the specimen 6 and leads to unwanted systematic errors. Naturally, more complicated geometric effects can lead to further specimen stage errors that are proportional to the z position of the specimen stage 2, for example, rotations based on torsionally distorted mirror surfaces for the measuring module 4.

Since this systematic error is linear in the tilt angle of the mirror 10, it can be completely avoided by inserting an additional solution parameter $\alpha_x$ in Equation (4) (the same applies to the mirror 14, which can alternatively or additionally be taken into consideration with an additional solution parameter $\alpha_y$):

$$\begin{pmatrix} mx_{S1}^{(1)} \\ mx_{S2}^{(1)} \\ \vdots \\ mx_{SN}^{(M)} \\ my_{S1}^{(1)} \\ my_{S2}^{(1)} \\ \vdots \\ my_{SN}^{(M)} \end{pmatrix} = \underline{K} \begin{bmatrix} mz_{S1}^{(1)} & 0 \\ mz_{S2}^{(1)} & 0 \\ \vdots & \vdots \\ mz_{SN}^{(M)} & 0 \\ 0 & mz_{S1}^{(1)} \\ 0 & mz_{S2}^{(1)} \\ \vdots & \vdots \\ 0 & mz_{SN}^{(M)} \end{bmatrix} \cdot \begin{pmatrix} \beta \\ \alpha_x \\ \alpha_y \end{pmatrix} \quad (9)$$

Here, K represents the original matrix K of Formula (4) and $\beta$ is the original parameter vector from Equation (4). The z-position of the specimen stage 2 in the $i^{th}$ individual measurement is labeled $mz_{S1}^{(J)}$, which belongs to the $J^{th}$ calibration position. Other errors proportional to z can also be treated analogously.

Starting from the standard example with additionally assumed tilting of the mirror 10 around the $y_S$ axis by 100 μrad with a height profile of the specimen 6 in which the z-positions of all 11×11 marks have a standard deviation of 5 μm, the resulting calibration error with introduction of the solution parameter $\alpha_x$ was smaller than $10^{-12}$ m everywhere, which can be attributed to numerical inaccuracies.

Figure 5:
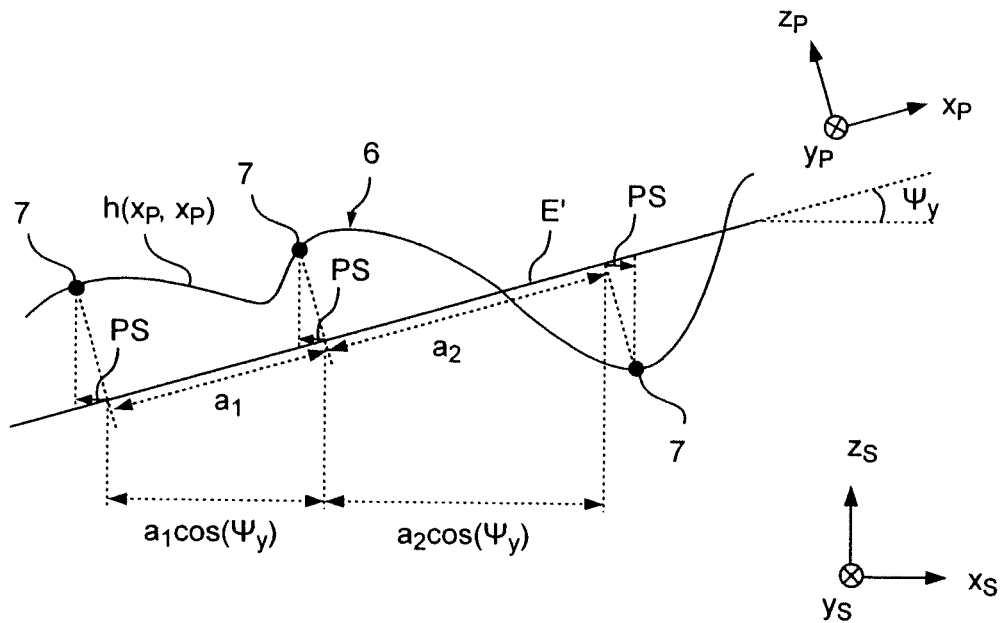
FIG. 5 is a diagram showing another example projection error.

In the systematic projection errors described in connection with FIG. 3 with tilted specimen, it was assumed that all of the marks 7 lie in a plane E. If this is not the case because of an uneven surface of the specimen 6, another projection error occurs as described below in connection with FIG. 5. The height profile of the surface of the specimen 6 can be described in the coordinate system P of the specimen 6 by a function $h(x_p, y_p)$. A tilt angle $\Psi_y$ around the $y_S$ axis then, in addition to the cosine shortening according to FIG. 3, produces a component of the magnitude $h(x_p, y_p) \cdot \sin(\Psi_y)$, which is illustrated in FIG. 5 by the arrow PS (another reference plane E' is drawn in FIG. 5 that is produced by averaging over the surface of the specimen 6).

To take this systematic error into consideration, the tilt angles $\Psi_x^{(J)}$ and $\Psi_y^{(J)}$ are measured in each calibration position. The height profile $z_{Pi}=h(x_{Pi},y_{Pi})$ of the specimen 6 is also measured at the locations of the marks 7. With this information, the measured value vector in Equation (4) can be corrected by the sine contribution of the projection effect, as follows:

$$\begin{pmatrix} mx_{S1}^{(1)} + z_{P1} \cdot \sin\Psi_y^{(1)} \\ mx_{S2}^{(1)} + z_{P2} \cdot \sin\Psi_y^{(1)} \\ \vdots \\ mx_{SN}^{(M)} + z_{PN} \cdot \sin\Psi_y^{(M)} \\ my_{S1}^{(1)} - z_{P1} \cdot \sin\Psi_x^{(1)} \\ my_{S2}^{(1)} - z_{P2} \cdot \sin\Psi_x^{(1)} \\ \vdots \\ my_{SN}^{(M)} - z_{PN} \cdot \sin\Psi_x^{(M)} \end{pmatrix} = \underline{K}(\psi_x^{(J)}, \psi_y^{(J)}, \psi_z^{(J)}, r_x^{(J)}, r_y^{(J)}, t_{xi}, t_{yi}) \cdot \begin{pmatrix} \lambda_1 \\ \vdots \\ \lambda_R \\ x_{P1} \\ \vdots \\ x_{PQ} \\ y_{P1} \\ \vdots \\ y_{PQ} \end{pmatrix}. \quad (10)$$

To determine the calibration error, in addition to the standard example, the following tilt angles in the individual calibration positions were assumed: $\Psi_x^{(1)}=300$ μrad, $\Psi_y^{(1)}=200$ μrad, $\Psi_x^{(2)}=-500$ μrad, and $\Psi_y^{(4)}=-300$ μrad. A height profile of the specimen 6 was also assumed in which the z positions of all 11×11 marks 7 have a standard deviation of 5 μm. The resulting calibration error was smaller than $10^{-12}$ m, which can be attributed to numerical inaccuracies.

The necessary tilt angles $\Psi_x$ and $\Psi_y$ can be determined, for example, by measuring the z position of the specimen stage 2 in each calibration position in combination with Equation (11) below:

$$\begin{pmatrix} x_S \\ y_S \\ z_S \end{pmatrix} = R_z(\psi_z) \cdot R_y(\psi_y) \cdot R_x(\psi_x) \cdot \left[ \begin{pmatrix} x_P \\ y_P \\ z_P \end{pmatrix} + \begin{pmatrix} r_x \\ r_y \\ r_z \end{pmatrix} \right] \quad (11)$$

Naturally it is also possible to determine the tilt angle by another measuring instrument.

Figure 6:
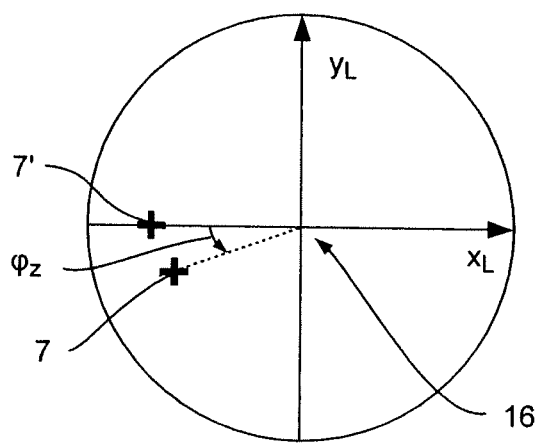
FIG. 6 is a diagram of an example image field of the microscope in FIG. 1 to illustrate another systematic measurement error.

In FIG. 6 another systematic error is indicated, which occurs when the specimen stage 2 is rotated around the reference point. The image field of the microscope 3 is illustrated schematically in FIG. 6 with a rotation of the specimen stage 2 around the $z_L$ axis of the coordinate system L of the metrology system 1. Thus, on the one hand, the mark position 7' for the angle of rotation $\phi_z=0$ (a rotation around the $z_L$ axis), and on the other hand the position of a mark 7 for a rotation of $\phi_z \geqq 0$ are shown. The error caused by the rotation is proportional to the distance of the mark 7 from the reference point 16 (in this case the origin of the coordinates of the coordinate system L), and is proportional in the first order to the angle of rotation $\phi_z$. The same applies to rotations around the $y_L$ axis and the $x_L$ axis (the corresponding angles of rotation are then labeled $\phi_x$ and $\phi_y$).

The rotation of the specimen stage 2 is measured for all three axes and this information is taken into consideration in Formula (12) below, which describes the measured values $mx_S$, $my_S$, and $mz_S$ of the positions of the marks 7. These measured values are entered into Equation (4) above.

$$\begin{pmatrix} mx_S \\ my_S \\ mz_S \end{pmatrix} = R_x^{-1}(\varphi_x) \cdot R_y^{-1}(\varphi_y) \cdot R_z^{-1}(\varphi_z) \cdot \begin{pmatrix} x_L \\ y_L \\ 0 \end{pmatrix} - \begin{pmatrix} t_x \\ t_y \\ t_z \end{pmatrix} \quad (12)$$

The calibration error is found to be smaller than $10^{-12}$ m in the standard example, and additionally with a positioning accuracy of the specimen stage 2 for translations with a standard deviation in x and y of 3 μm and a positioning accuracy of the specimen stage 2 for rotation around the z axis with a standard deviation of 10 μrad.

Figure 7:
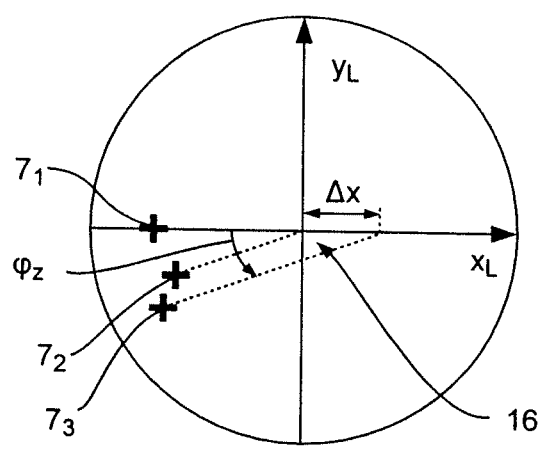
FIG. 7 is a diagram of an example image field of the microscope in FIG. 1 to illustrate another systematic measurement error.

In addition, when the specimen stage 2 is rotated around a point that is not identical with the reference point, a so-called Abbe error also occurs. In the example shown in FIG. 7, the center of rotation of the specimen stage 2 in the x direction is shifted away from the reference point by a distance Δx. The mark positions 7₁ and 7₂ are drawn in similarly, as in FIG. 6. The mark position 7₃ is also shown, at which the mark 7 is actually detected in the measurement. It is assumed that this shift is unknown. A rotation of the specimen stage 2 by the angle of rotation $\phi_z \neq 0$ around the $z_L$ axis, in addition to the contribution explained in connection with FIG. 6, would then produce a rotation-dependent measurement error of the magnitude $$\begin{pmatrix} \delta mx_S \\ \delta my_S \end{pmatrix} = \begin{pmatrix} \cos\varphi_z \cdot \Delta x \\ -\sin\varphi_z \cdot \Delta x \end{pmatrix} \approx \begin{pmatrix} 0 \\ -\varphi_z \cdot \Delta x \end{pmatrix} \quad (13)$$

which is proportional to the displacement (Abbe error) Δx. The rotation-dependent total error is found by considering all three angles of rotation ($\phi_x$, $\phi_y$, $\phi_z$) and all three Abbe errors (Δx, Δy, Δz), to give $$\begin{pmatrix} \delta mx_S \\ \delta my_S \\ \delta mz_S \end{pmatrix} = R_x^{-1}(\varphi_x) \cdot R_y^{-1}(\varphi_y) \cdot R_z^{-1}(\varphi_z) \cdot \begin{pmatrix} -\Delta x \\ -\Delta y \\ -\Delta z \end{pmatrix} \quad (14)$$

In general, six degrees of freedom of the specimen stage 2 are measured for position determination with, for example, six interferometers 4, so that the errors may also depend in a complicated way on the measured rotations (different from the actual rotations). In this case, however, these can be expanded to power series in the three measured angles of rotation $\phi_x$, $\phi_y$, and $\phi_z$. Each term of this power series can then be considered as its own error contribution, and the first-order terms often suffice.

For example, Equation (4) is expanded by solution parameters that correspond to the rotation-dependent errors, as follows:

$$\begin{pmatrix} mx_{S1}^{(1)} \\ mx_{S2}^{(1)} \\ \vdots \\ mx_{SN}^{(M)} \\ my_{S1}^{(1)} \\ my_{S2}^{(1)} \\ \vdots \\ my_{SN}^{(M)} \end{pmatrix} = \underline{K} \begin{bmatrix} \varphi_{y1}^{(1)} & \varphi_{z1}^{(1)} & \dots & 0 & 0 & \dots \\ \varphi_{y2}^{(1)} & \varphi_{z2}^{(1)} & \dots & 0 & 0 & \dots \\ \vdots & \vdots & & \vdots & \vdots & \\ \varphi_{yN}^{(M)} & \varphi_{zN}^{(M)} & \dots & 0 & 0 & \\ 0 & 0 & \dots & \varphi_{x1}^{(1)} & \varphi_{z1}^{(1)} & \dots \\ 0 & 0 & \dots & \varphi_{x2}^{(1)} & \varphi_{z2}^{(1)} & \dots \\ \vdots & \vdots & & \vdots & \vdots & \\ 0 & 0 & \dots & \varphi_{xN}^{(M)} & \varphi_{zN}^{(M)} & \dots \end{bmatrix} \cdot \begin{pmatrix} \lambda \\ b_1 \\ b_2 \\ \vdots \\ c_1 \\ c_2 \\ \vdots \end{pmatrix} \quad (15)$$

Here, K designates the original matrix K according to Equation (4), and λ is the original parameter vector from Equation (4). Besides the illustrated selection of first-order terms, other orders can also be included in principle, for example, $\phi_y \cdot \phi_z$.

Considering the standard example and the positioning accuracy of the specimen stage for translations with a standard deviation of 3 μm in x and y and an Abbe error of Δx=100 μm, Δy=0, and Δz=0, a calibration error smaller than $10^{-12}$ is obtained, which can be attributed to numerical inaccuracies.

One advantage of this procedure consists is that the center of rotation of the specimen stage 2 can be known less accurately than in a case in which the rotation of the specimen stage 2 is not co-calibrated in the way described above. The solution of the above Equation 15 also includes information on the actual position of the center of rotation in the form of additional solution parameters b1, b2, . . . , c1, c2 . . . .

Figure 8:
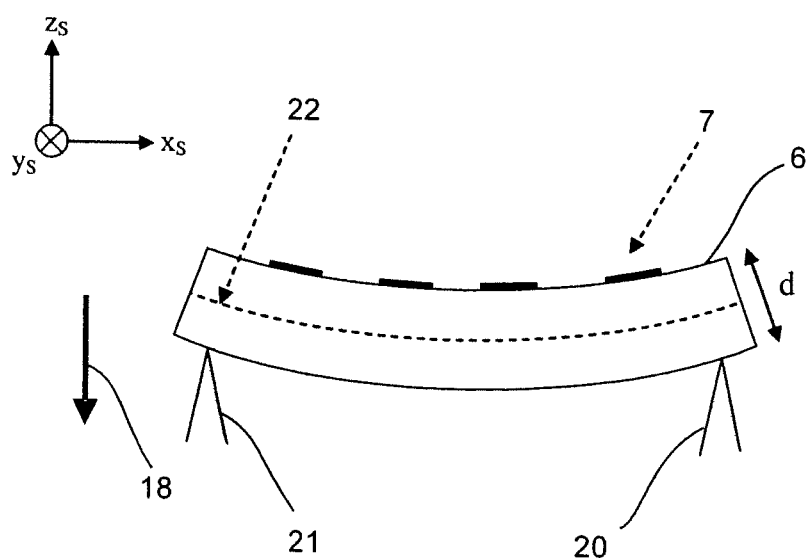
FIG. 8 is a schematic diagram to illustrate an example systematic measurement error based on a gravity-induced deformation of a specimen.

Another systematic error can be deformations of the specimen 6 caused by gravity. As illustrated schematically and distinctly exaggerated in the representation of FIG. 8, the specimen 7 is deformed because of gravity (indicated by the arrow 18), with the deformation depending on the points at which the specimen 6 is mounted on the specimen stage 2. Two supports 20, 21 are shown schematically in FIG. 8. The deformation of the specimen 2 can be described by means of a deformation field that has components in all three directions in space. In the example shown in FIG. 8, the distance between the individual marks 7 is smaller than the actual distance because of the compression at the top face of the specimen 6. The compression of the specimen 6 that prevails above the neutral line 22 is directly proportional to the thickness d of the specimen 6. The same applies to the stretching of the specimen in the region below the neutral line 22. The stretching is also directly proportional to the thickness d of the specimen 6. When the specimen 6 is positioned on the specimen stage 2 in the different calibration positions, the deformation changes each time depending on the actual positions of the supports 20, 21 relative to the specimen 6, which leads to an unwanted systematic error.

If the geometry and elastic material constants of the specimen 6 and of the supports 20, 21 are known, the deformation vector $\Delta g_i = (\Delta g_{i,x}, \Delta g_{i,y}, \Delta g_{i,z})$ can be calculated for each mark 7 in each calibration position as the difference between the actual position and a hypothetical zero-gravity position. It is important that these parameter do not change on a short scale, so that even relatively rough data on the positions of the marks 7 (initially not yet known accurately) are sufficient to determine the deformation vectors $\Delta g_i$ with sufficient accuracy. This is the case, for example, when the specimen 2 is a photolithographic mask.

If the deformation vectors $\Delta g_i$ are also small compared to the gradient of the specimen stage error, so that it is of the same magnitude with good accuracy in the actual and zero-gravity positions of a given mark 7, it is sufficient to make a first-order correction by subtracting the deformation components of the deformation vectors $\Delta g_i$ from the measured values. In this way, starting from the above Formula (4), the modified linear system of equations given below is arrived at:

$$\begin{pmatrix} mx_{S1}^{(1)} - \Delta g_{1,x}^{(1)} \\ mx_{S2}^{(1)} - \Delta g_{2,x}^{(1)} \\ \vdots \\ mx_{SN}^{(M)} - \Delta g_{N,x}^{(M)} \\ my_{S1}^{(1)} - \Delta g_{1,y}^{(1)} \\ my_{S2}^{(1)} - \Delta g_{2,y}^{(1)} \\ \vdots \\ my_{SN}^{(M)} - \Delta g_{N,y}^{(M)} \end{pmatrix} = \underline{K}(\psi_z^{(J)}, r_x^{(J)}, r_y^{(J)}, t_{xi}, t_{yi}) \cdot \begin{pmatrix} \lambda_1 \\ \vdots \\ \lambda_P \\ x_{P1} \\ \vdots \\ x_{PQ} \\ y_{P1} \\ \vdots \\ y_{PQ} \end{pmatrix} \quad (16)$$

The calibration error with consideration of this systematic error was smaller than $10^{-12}$ m, which again can be attributed to numerical inaccuracies, assuming in addition to the standard example deformations in the $z_S$ direction in the range of −3 to +4×$10^{-8}$ m in the first and fourth calibration positions, and −8 to +6×$10^{-9}$ m for the other calibration positions.

Consideration of this systematic error from deformation leads to the advantage that the rigidity requirement for the specimen 6 can be reduced compared to the case in which this systematic error is not taken into consideration in the calibration.

A proportional error in the deformation field may also occur when the modulus of elasticity, the density ρ of the specimen 6, and/or the position factor g of gravity are not known accurately. In the first order, the calculated deformation field is proportional to g·ρ/E, and an error δ(g·ρ/E) therefore leads in the first order to a proportional error of all components of the deformation field. For example, if the modulus of elasticity of the specimen 6 is known only with an accuracy of 1%, this can lead to errors of up to ±0.3 nm in the y position of the marks 7.

According to Equation (16), the error δ(g·ρ/E) leads in the first order to a proportional contribution that can be taken into consideration as follows by an additional solution parameter ϵ.

$$\begin{pmatrix} mx_{S1}^{(1)} - \Delta g_{1,x}^{(1)} \\ mx_{S2}^{(1)} - \Delta g_{2,x}^{(1)} \\ \vdots \\ mx_{SN}^{(M)} - \Delta g_{N,x}^{(M)} \\ my_{S1}^{(1)} - \Delta g_{1,y}^{(1)} \\ my_{S2}^{(1)} - \Delta g_{2,y}^{(1)} \\ \vdots \\ my_{SN}^{(M)} - \Delta g_{N,y}^{(M)} \end{pmatrix} = \underline{K} \begin{bmatrix} & \Delta g_{1,x}^{(1)} \\ & \Delta g_{2,x}^{(1)} \\ & \vdots \\ & \Delta g_{N,x}^{(M)} \\ & \Delta g_{1,y}^{(1)} \\ & \Delta g_{2,y}^{(1)} \\ & \vdots \\ & \Delta g_{N,y}^{(M)} \end{bmatrix} \cdot \begin{pmatrix} \lambda_1 \\ \vdots \\ \lambda_P \\ x_{P1} \\ \vdots \\ x_{PQ} \\ y_{P1} \\ \vdots \\ y_{PQ} \\ \varepsilon \end{pmatrix} \quad (17)$$

The resulting calibration error is smaller than $10^{-12}$ everywhere, with the same assumptions as in the above description of the deformation error, and with the additional assumption that deformation values Δg are too small by 1%. Since the value of ϵ was approximately 1.01, the modulus of elasticity accuracy of 1% itself leads to no calibration error.

The deformation field and with it an accurate value g·ρ/E can be determined by, for example, shifting the specimen stage 6 or rotating it by 90°. The difference between the two mark positions then corresponds to the change of the deformation field except for a possible rigid body movement.

This procedure assumes a calibrated specimen stage 2. According to the above example, the error $\delta(g \cdot \rho/E)$ is carried forward in full amount to the result of the calibration, so that the error in the calibration will be as large as the parameter to be measured. This dilemma can be solved by the correction method described here.

Beneficially, the position factor g as well as the modulus of elasticity and density of the specimen 2 can be known less accurately than in the case in which the deformation is not taken into consideration in the calibration. In addition, the information is also obtained through the solution parameter $\epsilon$ on how large the error in $g \cdot \rho/E$ is.

In the calibration described so far the specimen stage 2 is described by its errors in the mark positions; they constitute the specimen stage parameters in Equation (4). This procedure already provides the relative positions of the marks 7. However, an interpolation error has to be accepted for the specimen stage between the mark positions. Utilizing the positions of the marks 7 determined according to the above variants, the specimen stage error at intermediate grid positions can be better determined by bringing the grid (in this case 11×11 marks 7 in the square 7 mm grid) into a position not symmetrical with the grid. For example, this can include translations by a fraction of the grid constant (7 mm here) or rotations that are not multiples of 90°.

Figure 9:
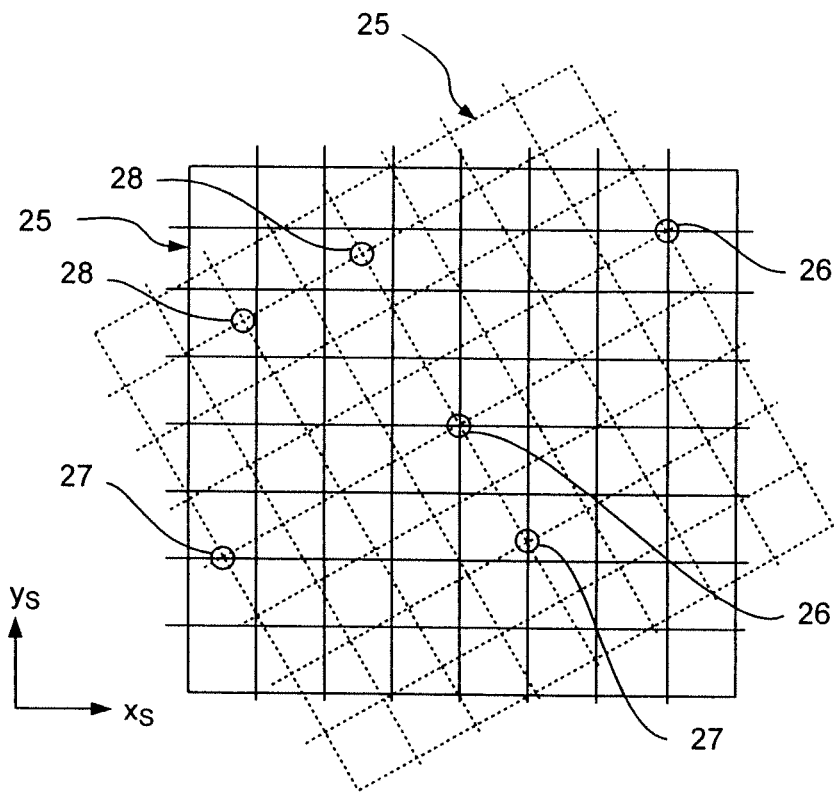
FIG. 9 is a diagram that shows a rotation of a specimen asymmetric to a grid.

Rotations of 30° and 60° are especially suitable. The Cartesian grid 25 that the marks 6 form is shown once in FIG. 9 with solid lines and once with broken lines rotated by 30°. Many grid points (positions of the marks) then lie approximately or even exactly on points of the unrotated grid (circles 26 in FIG. 9). Other points lie at intermediate grid positions, sometimes relative to only one coordinate (circles 27 in FIG. 9), often relative to both coordinates x and y (circles 28 in FIG. 9). From the grid-symmetrical calibration according to Equation (4), the specimen stage errors $f_x$ and $f_y$ are already known at the grid points of the solid-line grid, and also the relative positions $(x_{pi}, y_{pi})$ of the marks 7 on the specimen 6. The measurements at the grid positions 26, where marks 6 on the rotated grid coincide with the unrotated ones, therefore, can be used to determine very accurately the angle of rotation and the xy position of the specimen rotated by 30°. If this position information is then used and the specimen stage errors $f_x$ and $f_y$ are interpolated from the unrotated grid to the intermediate grid positions 27 and 28, then predictions can be made for the measured values $(mx_{Si}, mx_{Sj})$ of the specimen rotated by 30° for each of the intermediate grid positions 27 and 28. The difference between predicted and actual measured values determines by how much the actual specimen stage errors $f_x$ and $f_y$ at the intermediate grid positions 27 and 28 in question differ from the interpolated values. In this way the calibration of the specimen stage can be expanded by the correction values at the measured intermediate grid positions 27 and 28. This is advantageous especially when it can be assumed as an additional simplification that the contributions to the specimen stage errors along the x or y direction relevant to the interpolation errors are constant. In this case specifically, correction values that were determined at intermediate grid positions 27 and 28 apply not only locally at these points, but also for a straight line parallel to the x or y axis that passes through the intermediate grid point.

Figure 10:
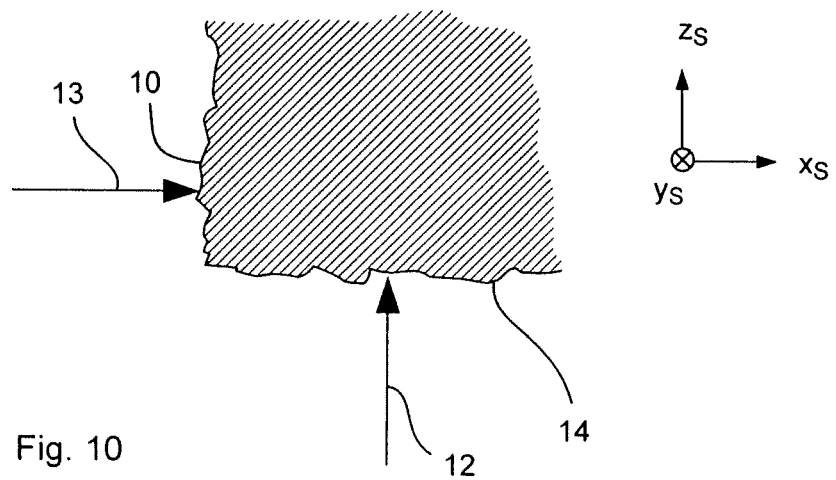
FIG. 10 is a schematic diagram to illustrate another example systematic measurement error.

A specimen stage error constant in $x_S$ or in $y_S$ occurs, for example, when the specimen stage 2 is measured in two dimensions by interferometry, as illustrated schematically in FIG. 10. Thus the rough x mirror 10 is measured by the measuring module 4 designed as an interferometer, as shown schematically by the arrow 13. The rough y mirror 14 is measured by another measuring module, as shown schematically by the arrow 12. The specimen stage error is constant in $y_S$ when the error is due to the measuring module 4, which is designed as the x interferometer (Group 1 error), or to the y mirror 14 (Group 4 error). In these cases the error varies with $x_S$. The error is constant in $x_S$ and varies with $y_S$ when it is due to the x mirror 10 (Group 2 error) or to the y interferometer 12 (Group 3 error).

In order to take the interpolation error into consideration in the calibration, additional solution parameters can be introduced into Equation (4) that correspond to the specified four groups of specimen stage errors (or a selection of them) at the additional supporting points. These do not have to coincide exactly with the positions of the marks 7 in the symmetry-breaking positions. In this case the matrix K has to interpolate from the additional supporting points to the position of the marks 7. The interpolation error produced is smaller than in the grid-symmetrical calibration because of the tighter support.

$$\begin{pmatrix} mx_{S1}^{(1)} \\ mx_{S2}^{(1)} \\ \vdots \\ mx_{SN}^{(M)} \\ my_{S1}^{(1)} \\ my_{S2}^{(1)} \\ \vdots \\ my_{SN}^{(M)} \end{pmatrix} = [\,K \mid \underline{K}_1 \mid \underline{K}_2 \mid \underline{K}_3 \mid \underline{K}_4\,] \cdot \begin{pmatrix} \beta \\ \lambda_1 \\ \lambda_2 \\ \lambda_3 \\ \lambda_4 \end{pmatrix} \quad (18)$$

In this matrix, $\beta$ represents the original parameter vector from Equation (4), i.e., the specimen stage errors at the grid points and the parameters for the mark positions. $\lambda_1$ are the Group 1 specimen stage errors at the additional supporting points and $K_1$ interpolates from these supporting points to the actual specimen stage positions. The same applies to $\lambda_2$ and $K_2$, etc. The interpolation in general can be of a type that mixes the five varieties of solution parameters with one another instead of handling them separately, as indicated in Formula (18). The column vectors of the matrix $K(t_x, t_y)$ are chosen to be linearly independent of the column vectors of the matrices $K_1(t_x, t_y)$ to $K_4(t_x, t_y)$ on a given grid or base region $(t_x, t_y)$ (orthogonality can be required in the stricter sense for the applicability of the Gauss optimization, but is not absolutely necessary). The problem with regard to the interpolation error can be solved by this procedure in a single computational step.

To be able to estimate the calibration error, in addition to the six calibration positions of the standard example, a 30° rotation and a 60° rotation were also simulated, and a sinusoidal error of the y mirror 14 was assumed for the specimen stage 2. For interpretation, parameters were introduced into Equation (18) for the fourth group, specifically two additional supporting points between each two Cartesian grid points.

Figure 11:
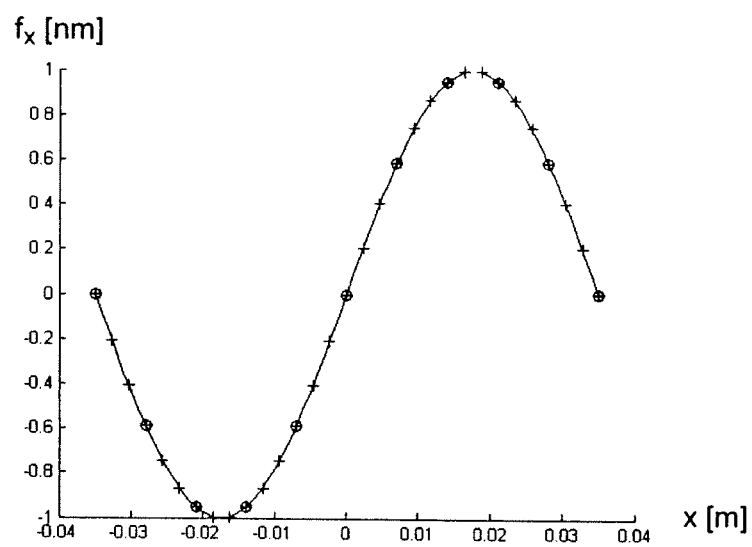
FIGS. 11 and 12 are graphs showing improved calibration.

FIG. 11 shows with linear interpolation a substantially better approximation to the initially assumed sine curve as the outcome of the standard interpretation, in which only the Cartesian grid is used. Thus, in FIG. 11, the assumed mirror profile $f_x$ (in nm) is represented as a solid line. The calibrated points with Cartesian calibration are shown as circles and calibrated points with rotations of 30° and 60° are shown as plus signs.

Figure 12:
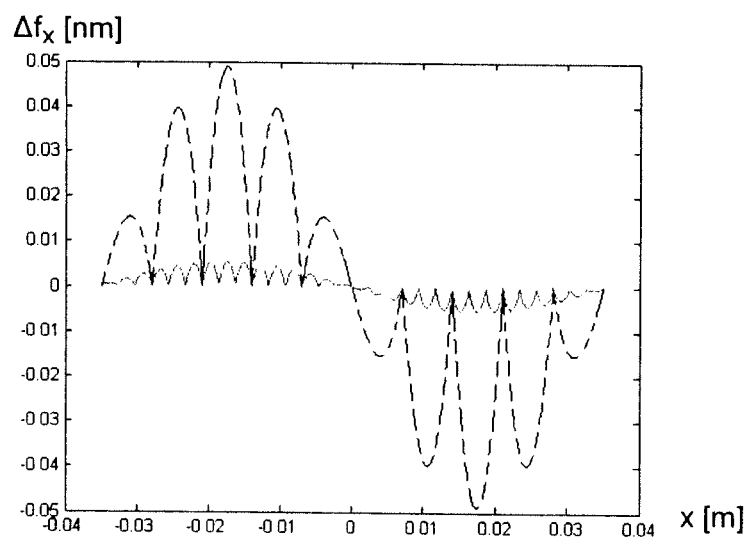

FIG. 12 also shows that the interpolation errors $\Delta f_x$ shown in nm with the Cartesian grid (shown with dashes) are distinctly larger than the interpolation errors with the additional parameters according to the 30° and 60° rotations indicated above.

The spatial resolution for the four Groups 1-4 of contributions to be calibrated relevant in practice can be increased with distinctly less measurement effort than by a tighter Cartesian grid dimensioning of the surface. The number of additional parameters to be determined grows only in proportion to the side length of the grid, while it would be proportional to the area for a tighter grid.

Figure 13:
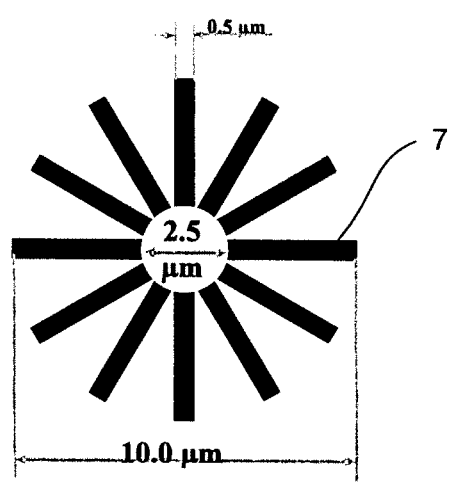
FIG. 13 is a diagram of an example design of a mark.

If a microscope 3 is used for detecting the marks 7 during the measurement, its image errors may depend on the orientation of the marks 7 used. Such a dependence can be avoided if the marks 7 are symmetrical with respect to all transformations that the specimen 6 undergoes in a given calibration sequence. If the described rotations not symmetrical with the grid are used, the usual cross-shaped or other marks with exclusively horizontal and vertical structures no longer satisfy these conditions. The mark 7 shown in FIG. 13, on the other hand, is invariant with rotations of a multiple of 30°, as an example.

This achieves the benefit that the errors of the microscope are invariant under the symmetry operations, so that they play no role in corresponding transformations of the specimen.

The methods described above can be performed not only with one specimen 6, but also with multiple different specimens 6, each of which has a plurality of marks 7. In this case, the methods described above are to be appropriately expanded, with additional parameters $x_{pl(\Omega)}$, $y_{pQ(\Omega)}$ being introduced for each other specimen $\Omega$.

The features described above related to processing of data, such as solving the equations described above, can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information from transmission to suitable receiver apparatus for execution by a programmable processor.

The described features related to processing of data can be implemented advantageously in one or more computer programs that are executable on a programmable system including at least one programmable processor coupled to receive data and instructions from, and to transmit data and instructions to, a data storage system, an input device, and an output device. A computer program is a set of instructions that can be used, directly or indirectly, in a computer to perform a certain activity or bring about a certain result. A computer program can be written in any form of programming language (e.g., Fortran, C, C++, Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems.

For example, the microscope 3 in FIG. 1 can be replaced by other types of optical systems. The measuring module 4 can be replaced by other types of measuring modules. Accordingly, other implementations are within the scope of the following claims.

What is claimed is:

1. A method for calibrating a specimen stage of a metrology system, the method comprising:
positioning a specimen having multiple marks successively in a plurality of calibration positions;
positioning each mark, by using the specimen stage, within a photography range of an optical system in each calibration position of the specimen, and measuring, using the optical system, the position of the mark;
establishing a model in which the positioning error of the specimen stage is represented by a system of functions having calibration parameters to be determined,
determining by an additional measurement at least one measurement error that occurs in the measurement of the positions of the marks;
representing the at least one measurement error by an additional calibration parameter; and
determining the values of the calibration parameters based on the model with consideration of the measured positions of the marks, wherein the model takes into account the at least one measurement error that occurs in the measurement of the positions of the marks.

2. The method of claim 1 in which the at least one measurement error is taken into account linearly in the model.

3. The method of claim 1 in which determining the values of the calibration parameters comprises using a Gaussian method of least squares of the errors to determine the values of the calibration parameters.

4. The method of claim 1 in which positioning the specimen comprises positioning the specimen in at least three different calibration positions.

5. The method of claim 1 in which the at least one measurement error comprises an imaging error of the optical system.

6. The method of claim 1 in which the at least one measurement error comprises a projection error in the measurement of the mark position due to a tilt of the specimen.

7. The method of claim 6, comprising measuring a component of the mark position perpendicular to a plane of the specimen stage in each calibration position.

8. The method of claim 1 in which the at least one measurement error comprises an error caused by an uneven arrangement of the marks.

9. The method of claim 1, comprising moving the specimen stage in a plane to position the marks, in which the at least one measurement error comprises a measurement error that is proportional to the position of the specimen stage perpendicular to the plane.

10. The method of claim 1, comprising positioning the specimen stage in an xy-plane, and the at least one measurement error comprises an error that is caused by a rotation of the specimen stage dependent on the x- or y-position of the specimen stage.

11. The method of claim 1 in which the at least one measurement error comprises an error caused by a gravity-induced deformation of the specimen.

12. The method of claim 1 in which the at least one measurement error comprises an error caused by the marks being spaced apart by more than a threshold.

13. The method of claim 1 in which the marks are arranged on the specimen in a Cartesian grid.

14. The method of claim 13 in which at least one calibration position comprises a rotation of the specimen that is not symmetrical with the grid.

15. The method of claim 14, comprising positioning the specimen stage in an xy-plane, and the measurement error comprises an error that depends on the x or y coordinate.

16. The method of claim 1 in which the system of functions is linear with respect to the calibration parameters.

17. The method of claim 1, comprising performing a two-dimensional calibration.

18. The method of claim 1 in which the specimen is positioned each time on the specimen stage in its calibration positions.

19. The method of claim 1, comprising positioning multiple specimens, each having multiple marks, successively in different calibration positions, and positioning each mark on each sample, by using the specimen stage, in each calibration position in the photography range of the optical system, and measuring the mark position using the optical system.

20. The method of claim 1 in which the model takes into account another measurement error that occurs in the measurement of the positions of the marks when the specimen stage is accurately positioned.

21. A metrology system comprising:
a specimen stage;
a measuring module configured to determine at least one measurement error; and
a control unit that controls the specimen stage to bring the specimen stage into a predetermined position, the control unit controlling the specimen stage based on a calibration model that takes into consideration positioning errors of the specimen stage and the at least one measurement error determined by the measuring module that occurs in the calibration of the specimen stage, to bring the specimen stage to the predetermined position, wherein the calibration model representing the at least one measurement error by an additional calibration parameter.

22. The metrology system of claim 21 in which the at least one systematic measurement error comprises an error in the measurement of positions of marks on a specimen that is positioned using the specimen stage.

23. The metrology system of claim 22 in which the at least one systematic measurement error comprises at least one of (a) an imaging error of an optical system that is used to measure the positions of the marks on the specimen, (b) an error due to a tilt of the specimen, (c) an error caused by an uneven arrangement of the marks, or (d) an error caused by a gravity-induced deformation of the specimen.

24. The metrology system of claim 21 in which the model comprises a linear function of the at least one systematic measurement error.

25. The metrology system of claim 24 in which the model comprises a system of functions that represents the positioning error of the specimen stage, the system of functions having calibration parameters to be determined.

26. An apparatus comprising:
a specimen stage to position a specimen having multiple marks successively in a plurality of calibration positions;
an optical system;
a control unit to control the specimen stage for positioning each mark within a photography range of the optical system in each calibration position, and control the optical system to measure the position of the mark;
a measuring module configured to determine at least one measurement error; and
a processing module to establish a model in which the positioning error of the specimen stage is represented by a system of functions having calibration parameters, the model taking into account at least one measurement error that occurs in the measurement of the positions of the marks as determined by the measuring module, the processing module determining the values of the calibration parameters based on the model with reference to the measured mark positions and an additional calibration parameter based on the at least one measurement error.

27. The apparatus of claim 26 in which the at least one measurement error comprises at least one of (a) an imaging error of an optical system that is used to measure the positions of the marks on the specimen, (b) an error due to a tilt of the specimen, (c) an error caused by an uneven arrangement of the marks, or (d) an error caused by a gravity-induced deformation of the specimen.

28. The apparatus of claim 26 in which the model comprises a linear function of the at least one measurement error.

* * * * *

UNITED STATES PATENT AND TRADEMARK OFFICE
CERTIFICATE OF CORRECTION

PATENT NO. : 8,473,237 B2  
APPLICATION NO. : 12/726908  
DATED : June 25, 2013  
INVENTOR(S) : Alexander Huebel et al.

Page 1 of 1

It is certified that error appears in the above-identified patent and that said Letters Patent is hereby corrected as shown below:

In the Specification:
Column 9,

Line 51 (Approx.), Equation 8, delete "$\underline{K}$" and insert -- $\underset{=}{K}$ --

Line 52 (Approx.), Equation 8, delete "$\underline{K}$" and insert -- $\underset{=}{K}$ --

In the Claims:
Column 20
Line 14, in Claim 22, after "one" delete "systematic"
Line 18, in Claim 23, after "one" delete "systematic"
Line 25, in Claim 24, after "one" delete "systematic"

Signed and Sealed this
Seventeenth Day of September, 2013

Teresa Stanek Rea
*Deputy Director of the United States Patent and Trademark Office*